Jan. 16, 1934.  D. L. LINDQUIST ET AL  1,943,682
MOVING STAIRWAY
Original Filed Feb. 10, 1933
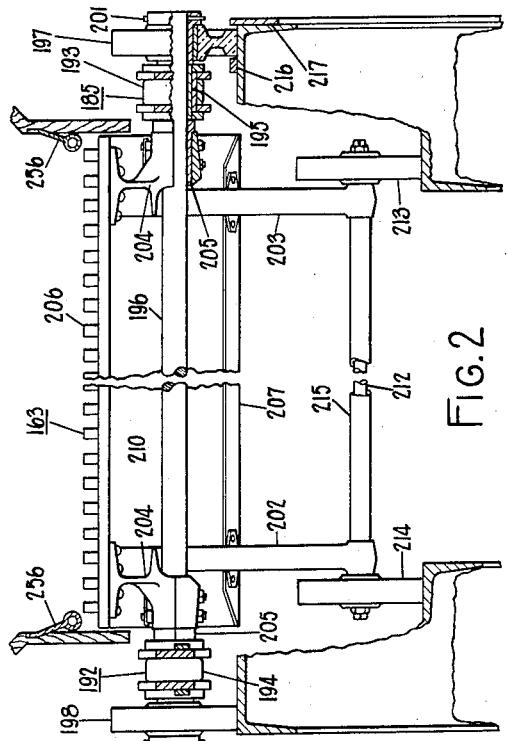
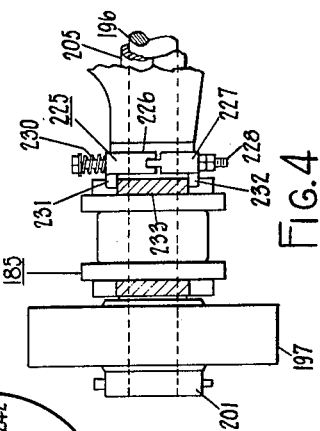
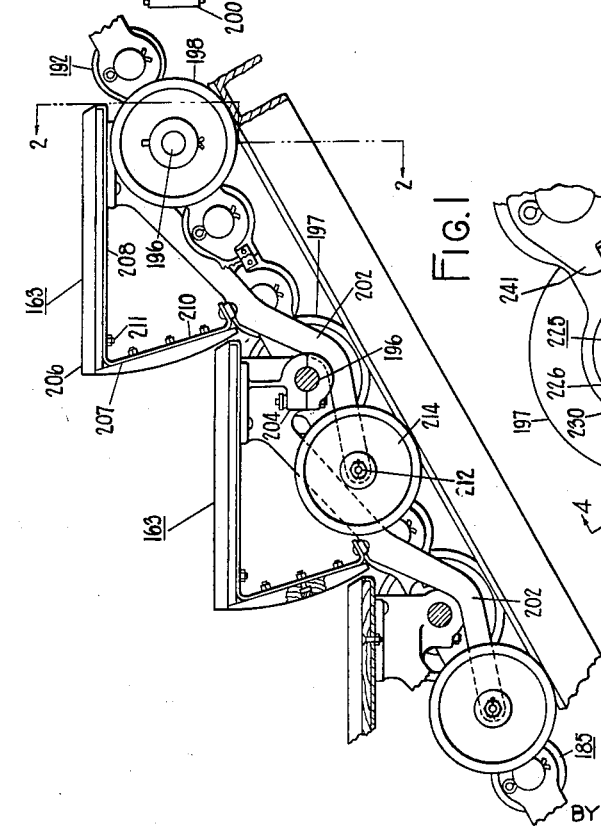
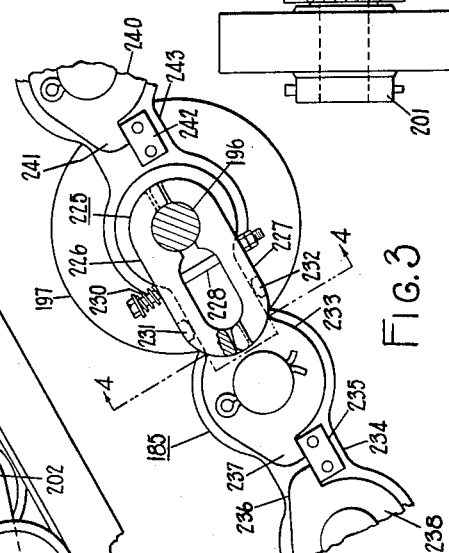
David Leonard Lindquist
Arthur Edward Handy   INVENTORS
Samuel Gustaf Margles
BY Matthew E. J. Bradley  ATTORNEY Patented Jan. 16, 1934

1,943,682

UNITED STATES PATENT OFFICE 1,943,682

MOVING STAIRWAY

David Leonard Lindquist, Hartsdale, and Arthur Edward Handy, Lynbrook, and Samuel Gustave Margles, Brooklyn, N. Y., assignors to Otis Elevator Company, New York, N. Y., a corporation of New Jersey Original application February 10, 1933, Serial No. 656,086. Divided and this application July 13, 1933. Serial No. 680,178

2 Claims. (Cl. 198—16)

This invention relates to moving stairways.

It is the object of this invention to provide a moving stairway which is particularly adapted for heavy duty and/or high rise installations, such as are encountered in railroad, subway and elevated stations.

Among the features of the moving stairway in accordance with this invention are the following:

Two equal-lengthed running gear chains, one at each side of the stairway, are connected at regular intervals by a series of uniformly spaced step axles, each step axle extending through corresponding hollow chain pins in the chains at opposite sides of the stairways. To each of such step axles, between the two running gear chains, is removably mounted a step, while on the portions of each of such step axles projecting out on either side of the stairway beyond the corresponding running gear chain are mounted two step wheels, for convenience hereinafter identified as the chain wheels. A unitary endless loop is thereby formed of the two connected running gear chains, from which loop any step or number of steps may be removed and replaced with ease, and without opening up either running gear chain or removing the step axle or axles connecting the running gear chains. Further, any one or more of the chain wheels on either side of the stairway may be removed and replaced with equal ease without opening up either running gear chain or removing any step axles. In addition, using uniformly pitched running gear chains, the sprocket wheels for such chains at the upper and lower landings may be formed with uniform teeth. Also, the pitch of the running gear chains and the size of the chain wheels are not interdependent, so that the optimum size for each may be employed.

Each step axle connecting the running gear chains at either side of the stairway is preferably free to rotate with respect to such chains, to the chain wheels mounted thereon, and to the step secured thereto. In the event, however, that the step axles display a tendency to rotate with the chain wheels, due, for example, to a possible predominance of the friction between the chain wheels and the step axles over the friction between the chains and the step axles, such rotation of the step axles may be prevented, if desired, by providing drag clutches for the step axles suitably connected to the chains.

The two remaining step wheels for each step, for convenience hereinafter identified as the trailer wheels, are located adjacent either side of such step and run upon trailer wheel tracks both while the steps are on the upper and on the return runs of the stairway. To guide the trailer wheels while the steps are passing around the sprocket wheels at the upper and lower landings, stationary semi-circular guides, each with an inner and an outer track flange, are provided.

The wheelbase of each step is made considerably longer than the step tread. In effecting this, each step is mounted upon its step axle so that the step axle is beneath the step tread near the base edge thereof (the edge opposite the nose of the step). The trailer wheels for each step are mounted upon suitable step yokes therefor, adjacent the ends of such step yokes which are arranged to extend into the region beneath the step tread of the next succeeding step. Such step yokes are formed with an appropriate curve so that they may pass under the step axle for such next succeeding step. The wheelbase of each step thus is approximately one and one-half times a step pitch. Such a construction eliminates the possibility of tipping a step when the load thereon is at or near the nose of such step. Such a construction also promotes smoothness of operation.

This application is a division of patent application Serial No. 656,086, filed February 10, 1933.

Other features and advantages will become apparent from the specification taken in conjunction with the accompanying drawing.

In the drawing:—

Figure 1 is an enlarged side elevation of the steps of the stairway on the upper run thereof, with portions broken away to illustrate certain details of the steps and running gear chains;

Figure 2 is a vertical section of the stairway taken along the line 2—2 of Figure 1;

Figure 3 is an enlarged detail illustrating a modified construction; and

Figure 4 is a section taken along the line 4—4 of Figure 3.

Reference is now made to Figures 1 and 2 which illustrate the steps 163, the running gear chains, and the stairway tracks while the steps are on the upper incline portion of the stairway. The two running gear chains 185 and 192, one at either side of the stairway, are similar in construction, each being of the double link roller type, with uniformly spaced chain bushings or rollers, 193 for chain 185 and 194 for chain 192, of uniform outside diameter. At every third chain roller in each of the two running gear chains, the chain is provided with a hollow pin, such as pin 195 for chain 185. Connecting the two running gear chains at each of the points therein having such hollow pins, there is a step axle 196 extending across the stairway, through the hollow chain pins, and projecting out beyond each chain. Upon each such projecting portion of each step axle 196 is mounted a chain wheel, the chain wheels adjacent running gear chain 185 being designated 197 while the chain wheels adjacent running gear chain 192 are designated 198. At the extreme ends of each step axle there are two collars 200 and 201 which are retained in position preferably by taper pins driven therethrough and through the step axle. The ends of such pins are split, and after assembly, are spread apart. It is preferred that each collar 200 and 201 be provided with a sleeve extending through the chain wheel and on which the chain wheel rotates. This sleeve is of sufficient length and diameter to provide clearance for the chain wheel between the running gear chain and the collar.

As a result of the foregoing construction, the two running gear chains 185 and 192 are connected together at every third chain link by a series of step axles 196 throughout the entire loops of the two running gear chains.

There is rotatably and removably mounted upon each step axle 196 a step 163. This is effected by each step having two step yokes 202 and 203, one near either side thereof, formed with hubs 204 for engaging step axles 196. Each step is rotatably secured to its step axle by means of bearing caps suitably secured to the hubs of the step yokes. It is preferred that a suitable split bushing 205 be interposed between each step axle and the step yokes engaging the same.

Each step 163 comprises a step tread 206, a step frame 207 and the two step yokes 202 and 203. The step frame is formed of suitable sheet material bent into shape and secured to the step yokes in the manner illustrated in Figure 1, so as to provide a tread support 208 and a riser 210. Step tread 206 is preferably formed with a plurality of cleats for the tread surface of each step, and is preferably removably secured to the tread support 208, as by bolts 211. Riser 210 has secured thereto a curved slab of suitable material such as wood, in order to provide an exteriorly curved riser for each step.

The trailer end of each of the step yokes 202 and 203 extends past the step axle of the next succeeding step and into the region beneath the step tread of such next succeeding step. In order that this may be effected, each of the step yokes 202 and 203 is formed with a bend, as illustrated for yoke 202 in Figure 1, so as to pass under the step axle of such next succeeding step. The trailer end of each of the step yokes 202 and 203 terminates before it engages any part of such next succeeding step. A trailer axle 212 connects the trailer ends of the two step yokes 202 and 203 and projects beyond each a short distance. On each such projecting portion of trailer axle is mounted a trailer wheel which rolls in a plane just inside the adjacent side edge of the step. The trailer wheel at the side of the step adjacent to chain 185 is designated 213, while the trailer wheel at the side of the step adjacent to chain 192 is designated 214. It is preferred that a spacing sleeve 215 be provided over trailer axle 212 between the step yokes 202 and 203.

The step wheels for each step, comprising the chain wheels 197 and 198 and the trailer wheels 213 and 214, are arranged to roll on the same incline plane during the time the steps are on the upper incline run of the stairway. This is illustrated in Figures 1 and 2, where the step wheels are shown as rolling upon tracks formed of inverted channels. The chain wheels at one side of the stairway, such as chain wheels 197, are guided on each side thereof, as by strip 216 and plate 217 shown in Figure 2. Lateral movement of the steps is thus prevented.

As shown in Figures 1 and 2, each step axle 196 is free to rotate with respect to the hollow chain pins and the chain wheels associated therewith. Preferably, the bore of the hollow chain pins is slightly larger than the diameter of step axles 196. This is to prevent binding of the step axles in the chain pins in the event there should be irregularities in the construction or movement of the running gear chains of such a nature that any hollow chain pin for one chain should not be in alignment with the corresponding hollow chain pin for the other chain.

Under certain conditions of design and operation, when a step axle 196 may have a tendency to rotate with a chain wheel and in a hollow chain pin, it may be desirable to prevent such rotation of the step axle. Under such circumstances, there may be provided for such step axle a drag clutch generally designated 225, such as illustrated in Figures 3 and 4. Each drag clutch comprises a pair of bow-shaped arms 226 and 227 with their ends interengaged, as by lug and slot connections. A pin 228 extends through both arms, and is provided with a spring 230 and suitable nuts and collars for urging the arms together. The arms 226 and 227 are shaped adjacent one of their ends so that they frictionally engage step axle 196, bushing 205 having a somewhat thinner head than as illustrated in Figure 2, so that step axle 196 may be engaged by arms 226 and 227. Arms 226 and 227 are provided with side lugs 231 and 232, respectively, which engage the adjacent link 233 of the running gear chain 185.

As a consequence, drag clutch 225 oscillates only as link 233 oscillates with respect to the running gear chain 185. The extent of this oscillation is comparatively minute, and in relation to the rotation of the step axle 196 that is to be prevented by the drag clutch, the drag clutch is substantially stationary. The frictional engagement of the arms of the stationary drag clutch with step axle 196 thus serves to prevent rotation of the step axle. When drag clutches are employed, it is preferred to employ them on only one side of the stairway so that there is only one drag clutch per step axle. If desired, however, any or all step axles may have two drag clutches, one at each side of the stairway.

An alternative means for preventing rotation of a step axle employs a member clamped or welded to collar 201, with the other end of such member extending around the adjacent chain wheel 197 and arranged to fit upon a suitable part of running gear chain 185, such as a link, or a chain pin, thereof.

If it is desired to prevent rotation of a step axle with the chain wheels mounted thereon, and also to have the step axle free to rotate in the hollow chain pins, collars 200 and 201 may be provided as parts separate from the sleeves on which the chain wheels rotate, with suitable securing or interconnecting means, such as lugs and recesses, cooperating between such chain wheel sleeves and the running gear chains for preventing rotation of such chain wheel sleeves. With such a construction, the rotation of the chain wheels cannot cause rotation of the step axles, and at the same time the features of a free step axle continue to exist.

In order to insure that the distance between adjacent step axles on the upper run of the stairway does not fall below a predetermined value, due, for example, to any tendency of a running gear chain to sag between adjacent step axles, the running gear chains are preferably of jack knife construction. This construction is illustrated for chain 185 in Figure 4, where, for one step pitch, the intermediate link 234 is provided with a stop 235 cooperating with extensions 236 and 237 on the other two links, 238 and 233, respectively. For the next succeeding step pitch the intermediate link 240 is provided with two extensions, one at each end (of which extension 241 is shown), cooperating respectively with stops on each of the two other links (of which stop 242 on link 243 is shown). If desired, the stops and extensions may be so proportioned that when the chain links between adjacent step axles are in a straight line, there is a small clearance between each extension and its cooperating stop. Under normal conditions with such a construction, the extensions do not engage the stops so that any noise resulting from such engagement is eliminated.

Inasmuch as many changes could be made in the above constructions and many apparently widely different embodiments of this invention could be made without departing from the scope thereof, it is intended that all matter contained in the above description or shown in the accompanying drawing shall be interpreted as illustrative and not in a limiting sense.

What is claimed is:—

1. In a moving stairway in which each step is mounted upon a step axle that extends across the stairway and through corresponding hollow chain pins in running gear chains at opposite sides of the stairway and in which two step wheels for each step are mounted on the step axle for such step, one at either side of the stairway; means retarding rotation of a step axle with respect to said chains, comprising, a drag clutch in frictional engagement with such step axle, and mechanism interlocking said drug clutch with a link of one of said running gear chains.

2. In a moving stairway; two uniformly pitched endless running gear chains of equal length, one at each side of the stairway, the chain pins at regular intervals in each of said chains being hollow; a plurality of axles, each of said axles extending through corresponding hollow chain pins in said chains at opposite sides of the stairway, and projecting out beyond said chains at both sides of the stairway; a drag clutch in frictional engagement with each step axle; means for preventing rotation of said drag clutches with respect to said chains; means for rotatably mounting each step upon its corresponding axle and for dismounting such step therefrom, while such axle remains in place connecting said two chains; and two step wheels for each of said steps, one for either side thereof, rotatably mounted on the portions of the corresponding axle for such step that project beyond said chains.

DAVID LEONARD LINDQUIST.
ARTHUR EDWARD HANDY.
SAMUEL GUSTAVE MARGLES.